US011775632B2

(12) United States Patent
Abbasian et al.

(10) Patent No.: US 11,775,632 B2
(45) Date of Patent: *Oct. 3, 2023

(54) CREDENTIAL MANAGER INTEGRATION

(71) Applicant: Apple Inc., Cupertino, CA (US)

(72) Inventors: Reza Abbasian, Milpitas, CA (US); Richard J. Mondello, Mountain View, CA (US); David P. Quesada, Mountain View, CA (US); Kyle C. Brogle, San Francisco, CA (US); Patrick L. Coffman, San Francisco, CA (US)

(73) Assignee: Apple Inc., Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/161,827

(22) Filed: Jan. 30, 2023

(65) Prior Publication Data

US 2023/0177141 A1 Jun. 8, 2023

Related U.S. Application Data

(62) Division of application No. 16/146,567, filed on Sep. 28, 2018, now Pat. No. 11,568,039.

(Continued)

(51) Int. Cl.
*G06F 21/45* (2013.01)
*G06F 21/60* (2013.01)
(Continued)

(52) U.S. Cl.
CPC ............ *G06F 21/45* (2013.01); *G06F 21/36* (2013.01); *G06F 21/604* (2013.01); *G06F 21/62* (2013.01);
(Continued)

(58) Field of Classification Search
CPC ........ G06F 21/45; G06F 21/36; G06F 21/604; G06F 21/62; G06F 21/78;
(Continued)

(56) References Cited

U.S. PATENT DOCUMENTS 7,647,256 B2 * 1/2010 Burch ................. H04L 67/10
705/29
8,850,572 B2 9/2014 Paterson et al.
(Continued)

OTHER PUBLICATIONS

Z. Yan, G. Gan and K. Riad, "BC-PDS: Protecting Privacy and Self-Sovereignty through BlockChains for OpenPDS," 2017 IEEE Symposium on Service-Oriented System Engineering (SOSE), San Francisco, CA, USA, 2017, pp. 138-144, doi: 10.1109/SOSE.2017. 30. (Year: 2017).*

(Continued)

*Primary Examiner* — Jung W Kim
*Assistant Examiner* — Sameera Wickramasuriya
(74) *Attorney, Agent, or Firm* — Kowert, Hood, Munyon, Rankin & Goetzel, P.C.; Paul T. Seegers; Dean M. Munyon (57) ABSTRACT

Techniques are disclosed relating to credential managers. In some embodiments, a computing device maintains a credential manager that stores, in a protected manner, a set of credentials for authenticating a user and metadata about the credentials. The computing device stores an instance of the metadata externally to the credential manager. The computing device uses the externally stored metadata to determine whether the set of credentials includes a particular credential associated with a service and, in response to determining that the set of credentials includes the particular credential, displays an indication of the particular credential. In some embodiments, the computing device receives a selection of the displayed indication by the user and, in response to the selection, sends a request for the particular credential to the credential manager.

20 Claims, 6 Drawing Sheets

Related U.S. Application Data (60) Provisional application No. 62/679,903, filed on Jun. 3, 2018.

(51) Int. Cl.
   *G06F 21/62* (2013.01)
   *G06F 21/36* (2013.01)
   *H04L 9/40* (2022.01)
   *G06F 21/78* (2013.01)

(52) U.S. Cl.
   CPC ............ *G06F 21/78* (2013.01); *H04L 63/083* (2013.01); *H04L 63/102* (2013.01); *G06F 2221/2103* (2013.01); *G06F 2221/2115* (2013.01)

(58) Field of Classification Search
   CPC ..... G06F 2221/2103; G06F 2221/2115; G06F 21/335; G06F 21/41; H04L 63/083; H04L 63/102
   See application file for complete search history.

(56) References Cited

U.S. PATENT DOCUMENTS

| | | | |
|---|---|---|---|
| 9,495,533 B2* | 11/2016 | Yiu | H04L 63/0807 |
| 10,015,171 B1* | 7/2018 | Vardy | H04L 63/102 |
| 10,200,439 B2* | 2/2019 | Oberle | H04L 67/02 |
| 10,255,013 B2* | 4/2019 | Su | H04N 1/4413 |
| 10,298,577 B1* | 5/2019 | Aithal | G06F 9/45558 |
| 10,911,428 B1* | 2/2021 | Roth | H04L 63/0823 |
| 10,931,662 B1* | 2/2021 | Church | H04L 63/0823 |
| 10,986,130 B1* | 4/2021 | Sellers | G06F 21/31 |
| 10,997,286 B1* | 5/2021 | Brassard | H04L 63/20 |
| 11,003,761 B2* | 5/2021 | Lingafelt | G06F 21/46 |
| 2006/0294578 A1* | 12/2006 | Burke | G06F 21/604 726/2 |
| 2009/0044260 A1* | 2/2009 | Niglio | H04L 63/0428 726/9 |
| 2010/0154041 A1* | 6/2010 | Dalzell | H04L 9/3213 726/6 |
| 2011/0154023 A1* | 6/2011 | Smith | H04L 9/321 713/168 |
| 2011/0231921 A1* | 9/2011 | Narayanan | G06F 21/335 726/9 |
| 2012/0233705 A1* | 9/2012 | Boysen | G06F 21/77 726/29 |
| 2014/0082350 A1* | 3/2014 | Zarfoss, III | H04L 63/083 713/155 |
| 2014/0173708 A1 | 6/2014 | Garlick | |
| 2014/0189808 A1* | 7/2014 | Mahaffey | G06F 21/31 726/4 |
| 2014/0298432 A1* | 10/2014 | Brown | G06F 21/34 726/6 |
| 2014/0366157 A1* | 12/2014 | Yancey | G06F 21/53 726/28 |
| 2015/0278504 A1* | 10/2015 | Azim | H04W 12/065 726/3 |
| 2015/0288694 A1* | 10/2015 | Liebl, III | H04L 9/3247 713/182 |
| 2016/0142399 A1* | 5/2016 | Pace | H04L 63/0815 726/4 |
| 2017/0199883 A1 | 7/2017 | Terry et al. | |
| 2018/0083959 A1* | 3/2018 | Barbosa | H04W 12/068 |
| 2018/0295135 A1* | 10/2018 | Feijoo | H04L 63/083 |
| 2019/0075115 A1* | 3/2019 | Anderson | H04L 63/083 |
| 2020/0028848 A1* | 1/2020 | Gupta | G06F 21/105 |
| 2020/0358822 A1 | 11/2020 | Erickson | |

OTHER PUBLICATIONS

M. A. Alyami, M. Almotairi, L. Aikins, A. R. Yataco and Y.-T. Song, "Managing personal health records using meta-data and cloud storage," 2017 IEEE/ACIS 16th International Conference on Computer and Information Science (ICIS), Wuhan, China, 2017, pp. 265-271, doi: 10.1109/ICIS.2017.7960004. (Year: 2017).*

S. M. Khan and K. W. Hamlen, "AnonymousCloud: A Data Ownership Privacy Provider Framework in Cloud Computing," 2012 IEEE 11th International Conference on Trust, Security and Privacy in Computing and Communications, 2012, pp. 170-176, (Year: 2012).

R. K. Lomotey and R. Deters, "Middleware-Layer for Authenticating Mobile Consumers of Amazon S3 Data*," 2013 IEEE International Conference on Cloud Engineering (IC2E), 2013, pp. 108-113, doi: 10.1109/IC2E.2013.10. (Year: 2013.

* cited by examiner

CREDENTIAL MANAGER INTEGRATION

The present application is a division of U.S. application Ser. No. 16/146,567, entitled "CREDENTIAL MANAGER INTEGRATION," filed Sep. 28, 2018 (now U.S. Pat. No. 11,568,039), which claims priority to U.S. Provisional App. No. 62/679,903, entitled "CREDENTIAL MANAGER INTEGRATION," filed Jun. 3, 2018; the disclosures of each of the above-referenced applications are incorporated by reference herein in their entireties.

BACKGROUND

Technical Field

This disclosure relates generally to computer security, and, more specifically, to credential managers.

Description of the Related Art

Many online services typically ask a user to create a username and password when registering with a service in order to facilitate a subsequent user authentication. Best practices are to use a long password and to not use the same password for different services as these practices can make it more difficult to compromise a password and gain access to multiple accounts of a user. To encourage this behavior, various credential managers have been developed that can assist in maintaining a user's passwords. For example, many modern web browsers may detect when a user has entered a password into a webpage and offer to store it for use in a subsequent authentication with the webpage.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "temperature circuit configured to measure an internal operating temperature of a processing element" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, a mobile device may have a first user and a second user. The term "first" is not limited to the initial user of the device. The term "first" may also be used when only one user of the mobile device exists.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION

In some instances, it may be desirable for a process other than the credential manager to know what credentials are being maintained by the manager. For example, if a user visits a website that presents an authentication prompt, a web browser of a computing device (or some other process) may want to determine whether the credential manager includes a relevant credential for the website and indicate a result to the user. Engaging the credential manager each time to ask whether it includes a relevant credential may be time consuming as a user may need to authenticate with the credential manager before being permitted to know whether the manager includes a relevant credential. Still further, if the credential manager is being engaged each time a user visits a website with an authentication page, the manager may be able to track what websites (or other services) are being accessed by the user regardless of whether a user wants to authenticate and may use this information for some potentially malicious purpose.

The present disclosure describes embodiments in which a determination of whether a credential manager includes a relevant credential for an authentication prompt can be made without having to engage the credential manager. As will be described in greater detail below, in various embodiments, a credential manager may provide metadata about its stored credentials to another process such as an operating system or an application of the computing device (or on another computing device) in some embodiments. When an authentication prompt is subsequently presented to a user, the metadata can be examined to determine whether the manager possesses a relevant credential. If the manager does possess the credential, the manager can then be asked for the credential. If it does not possess the credential, the user can be notified without having to involve the manager.

In some embodiments, collecting metadata about a credential manager's contents can be particularly beneficial with respect to third-party credential managers. (As used herein, a "third-party credential manager" refers to a credential manager provided by an entity other than one that manufactures the computing device, the device's operating system, or the device's web browser. A third-party credential manager stands in contrast to an integrated credential manager built into, for example, a web browser.) Accordingly, if a third-party credential manager requires a user authentication to view its contents through the manager, already having metadata about its contents can allow a determination about its contents to be made more quickly as the manager is not engaged. Still further, if the entity providing the manager is untrustworthy and attempting to track what services a user is accessing, the manager is not made aware of a user's attempt to access a particular service if the manager does not possess the corresponding credential or the user does not elect to retrieve the credential from the manager.

Figure 1:
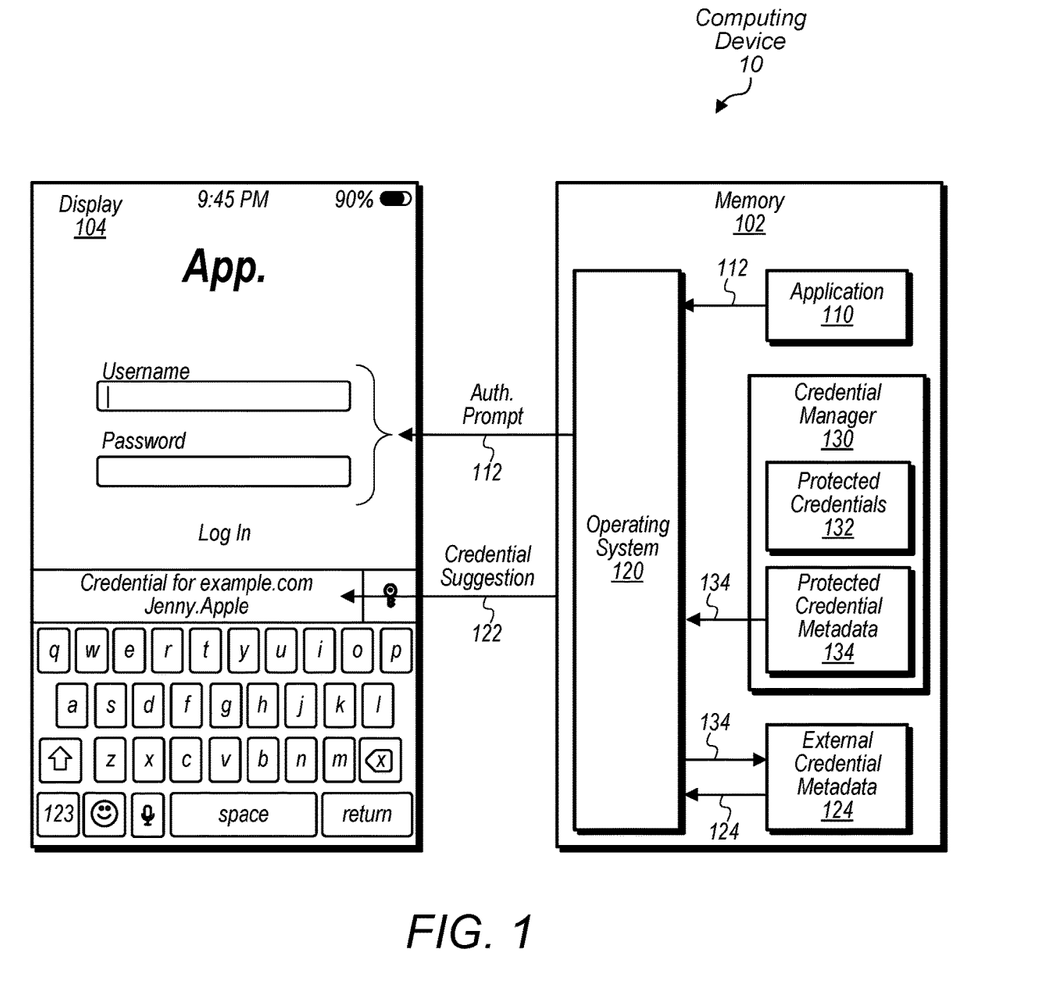
FIG. 1 is a block diagram illustrating an example of a computing device with integrated support for a credential manager.

Turning now to FIG. 1, a block diagram of a computing device 10 that integrates support for a credential manager is depicted. In the illustrated embodiment, computing device 10 includes memory 102 and a display 104. Memory 102 includes an application 110, operating system 120, and a credential manager 130. In some embodiments, computing device 10 may include more (or less) elements than depicted such as multiple credential managers 130, various elements discussed below with respect to FIG. 5, etc.

Application 110 may correspond to any suitable application that is executable to present an authentication prompt 112 soliciting a credential for authenticating a user with respect to a service. This service may pertain to, for example, accessing content maintained by application 110, enabling functionality of application 110, logging into application 110, etc. This service may also pertain to accessing information located externally from device 10. For example, application 110 may be an application associated with a streaming service and executable to stream various video content to device 10. In some embodiments, application 110 is a web browser executable to render webpages on display 104—thus, authentication prompt 112 may correspond to an authentication page for a website. In FIG. 1, authentication prompt 112 solicits a username and password; however, any suitable credential may be used. For example, in some embodiments, prompt 112 may solicit a one-time password (OTP), personal identification number (PIN), a digital signature generated by a cryptographic key, authentication token, etc. In some embodiments, prompt 112 may request two or more credentials. In some embodiments, application 110 is a web application downloaded and presented by a web browser of computing device 10.

Operating system (OS) 120, in various embodiments, is executable to manage functionally of device 10 including the presentation of content on display 104. In some embodiments, OS 120 receives an indication that application 110 is presenting an authentication prompt 112 and attempts provide a corresponding credential suggestion 122. In some embodiments, this indication may be a request to render authentication prompt 112 and explicitly identifies one or more input fields for a credential (e.g., a password text field)—thus, OS 120 may determine that authentication prompt 112 is being presented based on the presence of these fields. In some embodiments, this indication is a notification from application 110 explicitly indicating to OS 120 that it is asking for a user credential. In other embodiments, other techniques may be used by OS 120 to determine that an authentication prompt 112 is being presented on display 104. In various embodiments, in response to receiving an indication of prompt 112, OS 120 provides a credential suggestion 122, which may be selected by the user to provide the credential to application 110. As will be discussed below, this credential may be stored by credential manager 130 and suggested based on external credential metadata 124 discussed below. Although various functionality is described herein with respect to OS 120, this functionality may be implemented by an application other than an operating system in some embodiments such as a web browser, the application presenting the authentication prompt, etc.

Credential manager 130, in various embodiments is an application executable to maintain various protected credentials 132, which may correspond to any of the exemplary credentials noted above. In some embodiments, credential manager 130 is a third-party credential manager; however, in other embodiments, manager 130 may be integrated into operating system 120, a web browser, etc. In various embodiments, manager 130 protects credentials 132 using one or more cryptographic keys, which may be derived based on authentication information provided by the user to unlock manager 130. As such, manager 130 may request a user authentication prior to providing a protected credential 132 for use with respect to authentication prompt 112. In various embodiments, manager 130 also maintains various metadata 134 about credentials, which can be used to determine what credentials 132 are maintained by manager 130 and facilitate retrieval of those credential 132. In some embodiments, this metadata 134 may be protected in a similar manner as credentials 132. Although depicted as residing in computing device 10, in some embodiments, credential manager 130 may reside in a different computing device, which communicates with device 10 over a local area network or wide area network—thus, external credential metadata 124 stored in device 10 and discussed below may pertain to credentials 132 that are stored on another computing device separate from computing device 10, which can request the credentials 132.

Because protected credential metadata 134 may be inaccessible to OS 120, credential manager 130 may provide an instance (i.e., copy) of metadata 134 to OS 120, which is stored externally to manager 130 and depicted as external credential metadata 124 in the illustrated embodiment. In some embodiments, metadata 124 includes a subset of metadata 134, such as a credential's username, service identifier, etc., and is usable by OS 120 to determine whether relevant credential 132 exists for a presented prompt 112. If relevant credential 132 can be identified, OS 120 may present a credential suggestion 122 identifying the credential 132 on display 104. In some embodiments, this suggestion 122 is selectable to cause OS 120 to request the credential 132 from manager 130 and automatically provide the credential 132 to application 110. For example, selecting the suggestion 122 in FIG. 1 may cause OS 120 to retrieve the credential 132 for example.com and automatically populate the username field with Jenny.Apple and the password field with the credential 132 once received from manager 130. If OS 120 is not able to identify a relevant credential 132, OS 120 may still present of a list of credentials 132 and allow a user to select one—e.g., in response to selecting the key icon depicted in FIG. 1. As will be discussed with FIG. 2, in various embodiments, OS 120 provides an API to credential manager 130 that allows manager 130 to provide metadata 124 and OS 120 to request credentials 132.

Figure 2:
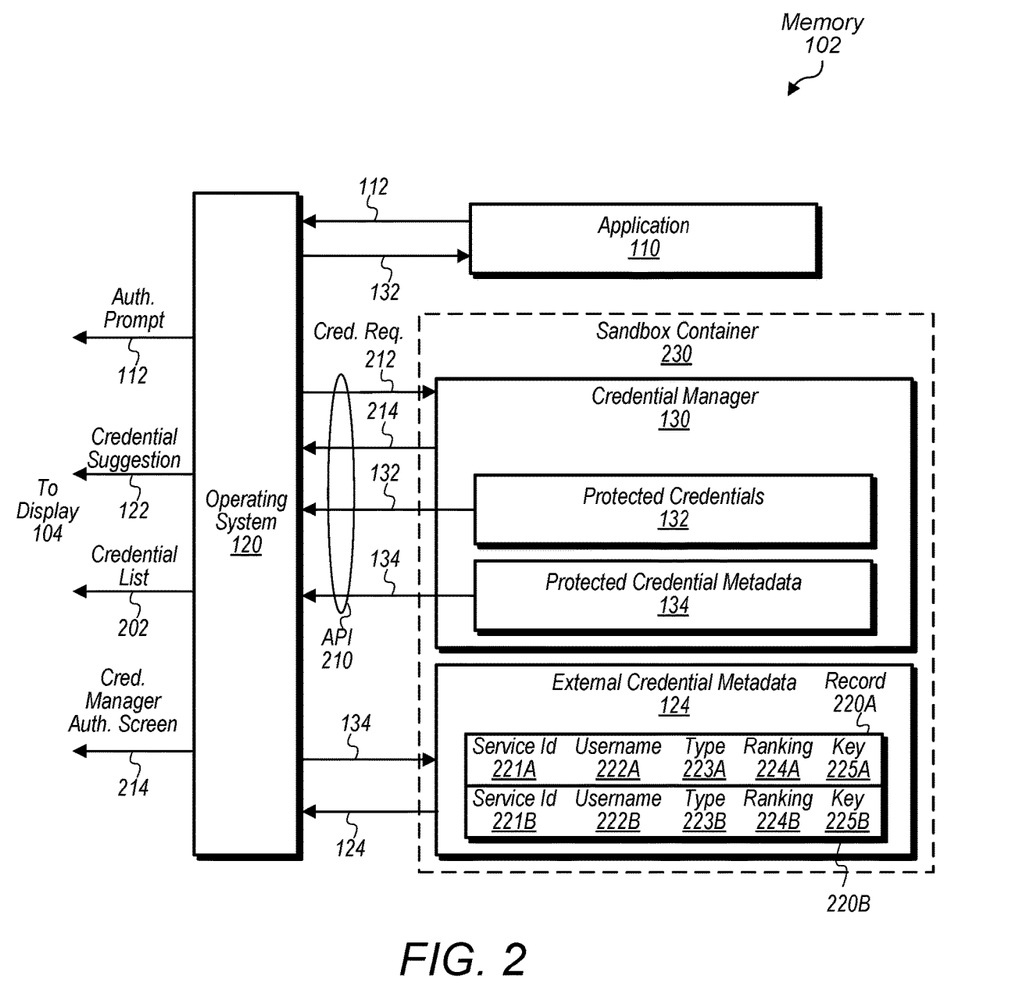
FIG. 2 is a block diagram illustrating an exemplary interaction between an application, operating system, and credential manager of the computing device.

Turning now to FIG. 2, a block diagram of an interaction between elements 110-130 is depicted. As shown, OS 120 may provide an API 210 to facilitate communication between elements 110-130. In the illustrated embodiment, API 210 is used by OS 120 to send a credential request 212 to credential manager 130 and supply the requested credential 132 to application 110.

As noted above, OS 120 may send a credential request 212 to credential manager 130 in response to a user selecting a credential suggestion 122 or selecting a credential identified in a credential list 202 discussed below with respect to FIG. 3. In some embodiments, in response to receiving a request 212 for a credential 132, credential manager 130 provides an authentication screen 214 via API 210 to be presented on display 104 in order to authenticate the user. Credential manager 130 may use any suitable techniques to authenticate the user. As noted above, in some embodiments, manager 130 obtains information from screen 214 that is usable to derive an encryption/decryption key protecting credentials 132.

In various embodiments, API 210 is also used by OS 120 to obtain metadata 134 and store it externally as metadata 124. In some embodiments, OS 120 receives an initial set of metadata 134 via API 210 when a user installs and registers manager 130 with OS 120. As additional credentials 132 are added or removed, credential manager 130 invokes API 210 to notify OS 120 of any updates to metadata 134—and thus metadata 124. Metadata 124 may include any of metadata 134 maintained by credential manager 130. In the illustrated embodiments, metadata 124 includes a record 220 for each protected credential 132, and each record 220 includes a respective service identifier 221, username 222, type 223, ranking 224, and a key 225. In other embodiments, more (or less) elements may be included in records 220.

Service identifier 221, in various embodiments, indicates a particular service associated with a given credential 132. Accordingly, if a given credential 132 is used to authenticate for a service associated with a website, in some embodiments, identifier 221 may identify the particular website. For example, identifier 221 may specify a domain, a uniform resource locator (URL), internet protocol (IP) address, etc. If a given credential 132 is used to authenticate for a service provided by an application other than a web browser, in some embodiments, identifier 221 may identify the particular application. For example, identifier 221 may specify the name of application 110, the name of application 110's executable file, the directory path to the executable file, etc. In various embodiments, OS 120 determines whether a given credential 132 is relevant to an authentication prompt 112 by comparing the prompt 112's service with the service indicated by a credential 132's service identifier 221.

Username 222, in various embodiments, is an account name associated with a given service. Examples of usernames 222 may include an email address, a name of a user, an account number, etc. In some embodiments, a given record 220 may not include a username 222 depending on the type of credential.

Type 223, in various embodiments, identifies the type of a given credential 132. As noted above, credentials 132 may include, for example, user passwords, one-time passwords (OTPs), personal identification numbers (PINs), digital signatures generated by cryptographic keys, authentication tokens, etc. Thus, a type 223 for a given credential 132 may identify that credential 132 as a PIN, for example.

Ranking 224, in various embodiments, is a value that indicates a preference for a particular credential 132 with respect to a given service. Accordingly, a user may have multiple credentials with respect to a given service—e.g., a user may have a credential 132 associated with a personal email account and a credential 132 associated with a work email account. In some embodiments, credential manager 130 may rank these credentials 132 and provide an indication of this ranking to OS 120 as rankings 224. In such an embodiment, OS 120 may identify the credential 132, for example, with the highest ranking 224 in its credential suggestion 122.

Key 225, in various embodiments, is a value that can be included in a credential request 212 to facilitate manager 130's retrieval of a requested credential 132. In some embodiments, credential manager 130 maintains credentials 132 in a database organized such that each credential 132 is retrievable using a respective key 225—e.g., the database may be a key-value store. In such an embodiment, credential manager 130 may identify these database keys 225 to OS 120 to expedite retrieval of a credential 132.

Credential suggestion 122 and/or credential list 202 may also display one or more elements 221-225 in order to assist a user in selecting an appropriate credential 132 to provide to application 110. In some embodiments, suggestion 122 and/or list 202 may also identify the name of credential manager 130 in instances in which a user has installed multiple credential managers 130—e.g., a first credential manager 130 for storing work-related credentials and a second credential manager 130 for storing personal credentials.

In various embodiments, OS 120 uses one or more techniques to protect external credential metadata 124. In some embodiments, OS 120 encrypts metadata 124 with an encryption key known only to OS 120—thus some other malicious application may be prevented from accessing metadata 124. In the illustrated embodiment, external credential metadata 124 and credential manager 130 are included with in a sandbox container 230 instantiated by OS 120 in memory 102.

Sandbox container 230, in various embodiments, is operable to isolate credential manager 130 from other applications executing on computing device 10. In some embodiments, sandbox container 230 may be implemented using containers such as a virtual machine, control group (Cgroup), namespace, Linux container (LXC), etc. In some embodiments, container 230 is operable to isolate credential manager 130's data from other applications. For example, container 230 may include a region of memory 102 dedicated to manager 130 such that manager 130 is the only application (excluding OS 120) capable of accessing the region. In some embodiments, container 230 is operable to isolate execution of credential manager 130 from other applications. Accordingly, container 230 may limit what can be perceived by an executing process of manager 130 and processes of applications external to container 230, which may reside in their own containers 230. Such a container 230 may, for example, prevent an internal process from knowing about outside processes (and external processes from knowing about internal processes), present a limited perspective of the underlying hardware resources (such as presenting a virtual network interface as opposed to exposing to the physical interface), etc. In some embodiments, if credential manager 130 is deleted, the container 230's contents are also deleted—thus, external metadata 124 is not preserved after a user has requested deletion of credential manager 130.

Figure 3:
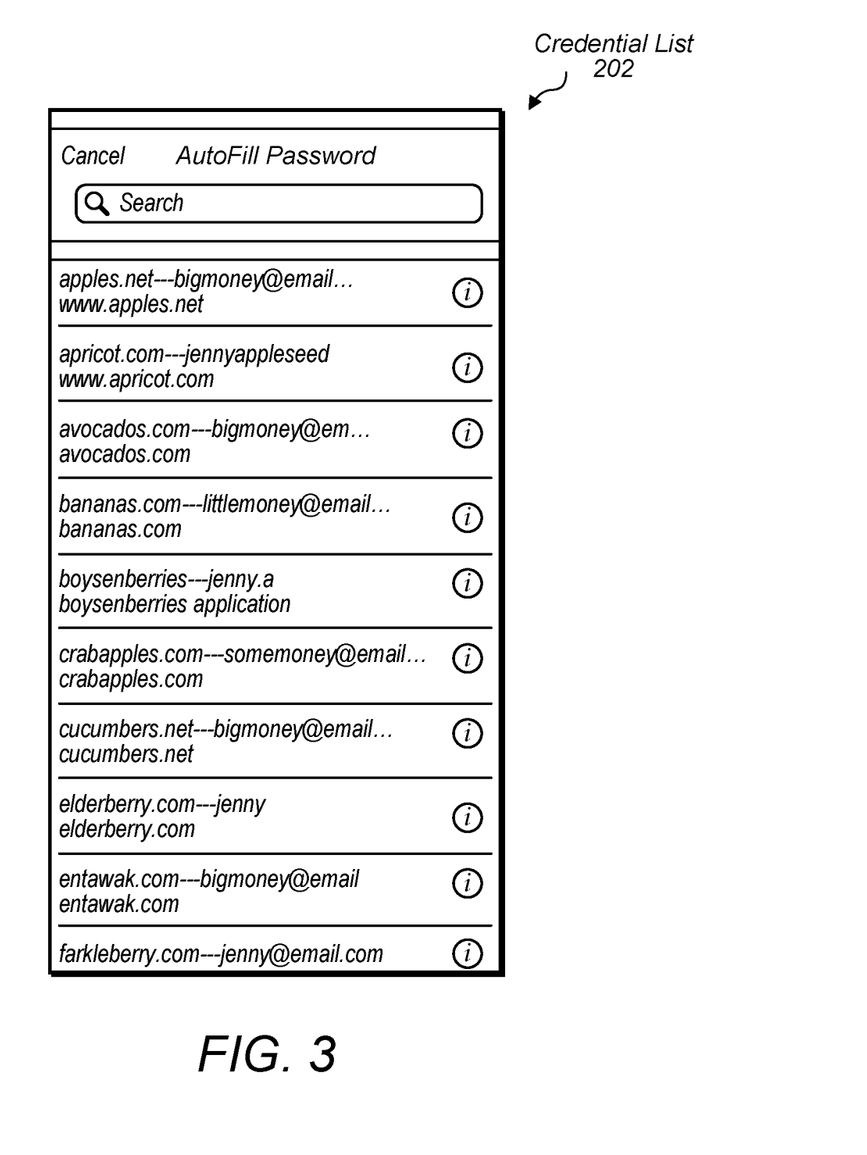
FIG. 3 is a diagram illustrating an example of a credential list presented on a display of the computing device.

Turning now to FIG. 3, a diagram of a credential list 202 is depicted. As noted above, in some embodiments, a user may elect to not select the suggested credential 122 and want to view a list of the credentials 132 available for authentication. As such, a user may select, for example, the key icon in FIG. 1 to cause OS 120 to present a credential list 202 generated based on external credential metadata 124. As shown, credential list 202 may include identify the various credentials 132 maintained by manager 130 and allow a user to select one cause the credential 132 to be provided to application 101. Accordingly, selecting the credential for apricot.com, for example, may cause OS 120 to populate the username field in prompt 112 of FIG. 1 with "jennyappleseed" and populate the password field with the corresponding password maintained by manager 130. If the depicted portion of list 202 does not include the desired credential, a user may scroll through the list 202 or enter an input into the depicted search field to search for the desired credential. In the illustrated embodiment, selecting the 'i' icon may allow a user to view additional information such one or more of elements 221-225.

Figure 4A:
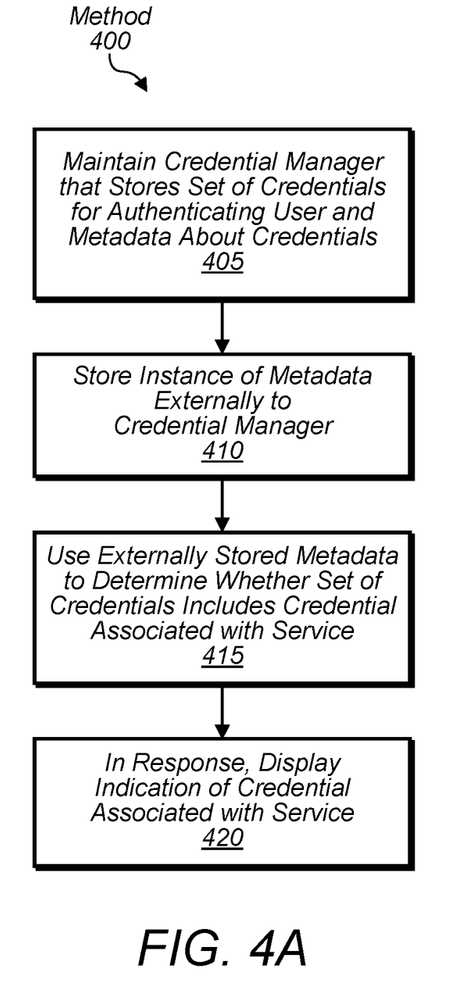
FIGS. 4A-4C are flow diagrams illustrating examples of methods associated with using a credential manager.

Turning now to FIG. 4A, a flow diagram of a method 400 is depicted. In various embodiments, method 400 is performed a computing device such as device 10 executing OS 120. In some embodiments, method 400 allows the contents of the manager to be efficiently determined without interacting with the manager.

In step 405, the computing device maintains a credential manager (e.g., credential manager 130) that stores, in a protected manner, a set of credentials for authenticating a user (e.g., protected credentials 132) and metadata about the credentials (e.g., protected credential metadata 134).

In step 410, the computing device stores an instance of the metadata externally to the credential manager (e.g., external credential metadata 124). In some embodiments, the computing device maintains the credential manager in a container (e.g., sandbox container 230) operable to isolate data of the credential manager from other applications executing on the computing device and stores the instance of the metadata within the container. In some embodiments, the computing device subsequently receives a request to delete the credential manager and, in response to the request, deletes the container including deleting the instance of the metadata. In some embodiments, an operating system (e.g., OS 120) of the computing device presents an application programming interface (API) (e.g., API 210) for communicating with the credential manager and receives the instance of the metadata from the credential manager via the API presented by the operating system.

In step 415, the computing device uses the externally stored metadata to determine whether the set of credentials includes a particular credential associated with a service for which the user is being authenticated. In some embodiments, the metadata includes, for the particular credential, a username (e.g., username 222), a credential type (e.g., type 223), and a service identifier (e.g., service identifier 221), and the using includes identifying the particular credential based on the service identifier being associated with the service. In some embodiments, the metadata includes a first ranking (e.g., ranking 224A) for a first credential associated with the service and a second ranking (e.g., ranking 224B) for a second credential associated with the service, and the using includes selecting one of the first and second credentials as the particular credential based on the first and second rankings.

In step 420, in response to determining that the set of credentials includes the particular credential, the computing device displays an indication (e.g., credential suggestion 122) of the particular credential. In some embodiments, the displayed indication identifies the username (e.g. Jenny.Apple in FIG. 1) for the particular credential and the credential type for the particular credential. In some embodiments, method 400 further includes the computing device receiving a selection of the displayed indication by the user and, in response to the selection, sending a request for the particular credential to the credential manager. In some embodiments, method 400 includes receiving the particular credential from the credential manager and automatically supplying the particular credential to one or more input fields in an authentication prompt being presented. In some embodiments, the computing device maintains a plurality of credential managers that store credentials for authenticating the user, and the displayed indication identifies a name of the credential manager storing the particular credential.

Figure 4B:
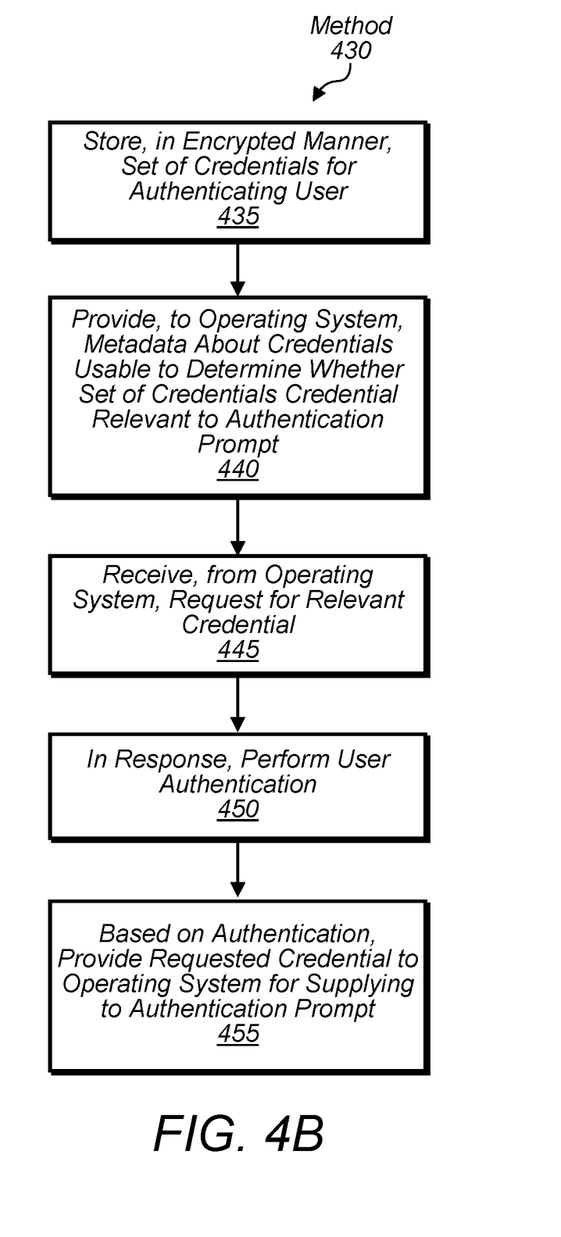

Turning now to FIG. 4B, a flow diagram of a method 430 is depicted. In various embodiments, method 430 is performed by a credential manager such as credential manager 130. In some embodiments, method 430 allows the contents of the manager to be efficiently determined without interacting with the manager.

Method 430 begins in step 435 with the credential manager storing, in an encrypted manner, a set of credentials for authenticating a user (e.g., protected credentials 132). In step 440, the credential manager provides metadata about the credentials (e.g., credential metadata 124) to an operating system (e.g., OS 120) of the computing device, the metadata being usable by the operating system to determine whether the set of credentials includes a credential relevant to an authentication prompt (e.g., authentication prompt 112). In some embodiments, the metadata includes usernames (e.g., usernames 222) associated with the credentials. In some embodiments, the metadata includes a service identifier (e.g., service identifier 221) for the credential that indicates a service associated with the credential and is usable by the operating system to determine that the credential is relevant to the authentication prompt. In some embodiments, the credential manager maintains a ranking of credentials associated with the service, and the provided metadata includes information (e.g., rankings 224) about the ranking usable by the operating system to select the relevant credential. In some embodiments, the credential manager stores the relevant credential in a database such that the relevant credential is retrievable from the database using a key (e.g., key 225), and the metadata includes the key associated with the relevant credential. In step 445, the credential manager receives, from the operating system, a request (e.g., request 212) for the relevant credential. In step 450, in response to the request, the credential manager performs an authentication of the user (e.g., via authentication screen 214). In step 455, based on the authentication, the credential manager provides the requested credential to the operating system for supplying to the authentication prompt. In some embodiments, method 430 further includes the credential manager receiving a request to store an additional credential for authenticating the user, storing the additional credential in an encrypted manner, and invoking an application programming interface (API) (e.g., API 210) of the operating system to provide metadata about the additional credential.

Figure 4C:
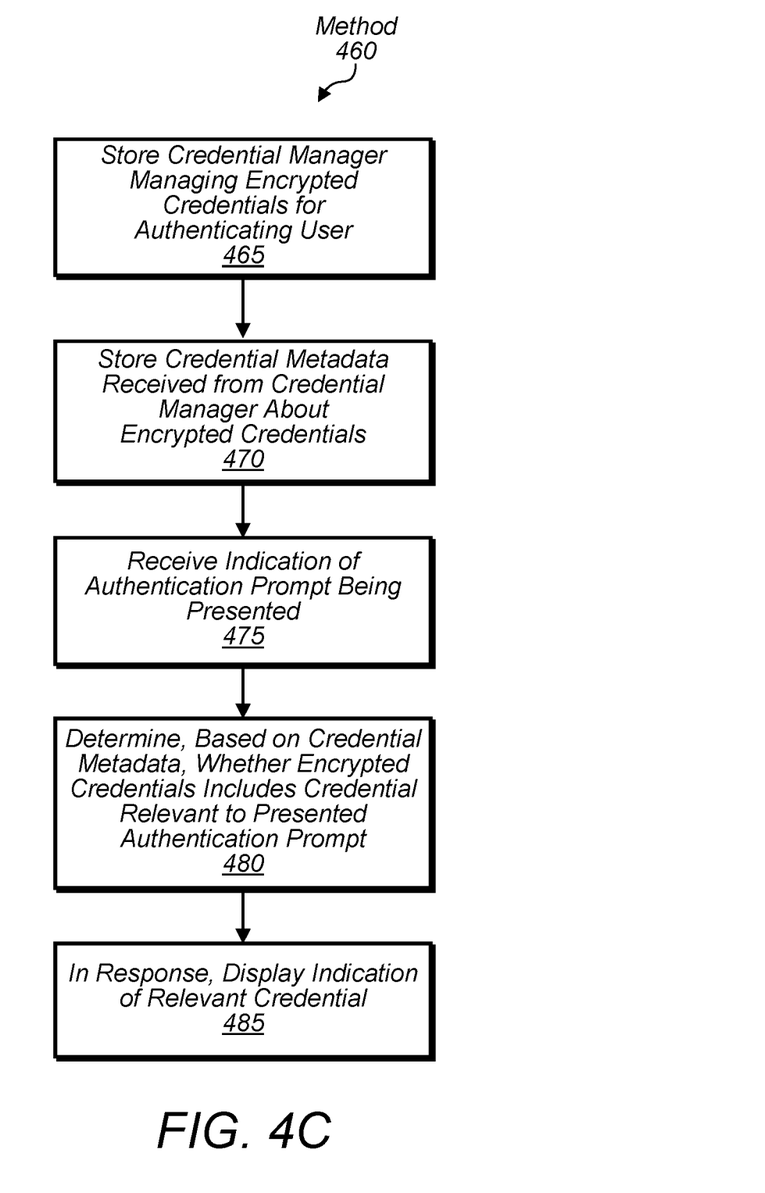

Turning now to FIG. 4C, a flow diagram of a method 460 is depicted. In various embodiments, method 460 is performed by a computing device using a credential manager such as device 10. In some embodiments, method 460 allows the contents of the manager to be efficiently determined without interacting with the manager.

Method 460 begins in step 465 with storing a credential manager (e.g., manager 130) that manages a plurality of encrypted credentials for authenticating a user (e.g., credentials 132). In step 470, the computing device stores credential metadata (e.g., external credential metadata 124) received from the credential manager about the plurality of encrypted credentials. In various embodiments, the credential metadata includes a respective username (e.g., username 222) and a respective service identifier (e.g., service identifier 221) for ones of the plurality of encrypted credentials. In some embodiments, a respective one of the service identifiers is associated with a name of an application or a domain of a website. In some embodiments, the computing device instantiates a container (e.g., sandbox container 230) operable to isolate the credential manager from other applications and stores the credential manager and credential metadata within the container. In step 475, the computing device receives an indication that an authentication prompt (e.g., authentication prompt 112) is being presented. In step 480, the computing device determines, based on the credential metadata, whether the plurality of credentials includes a credential relevant to the presented authentication prompt. In step 485, in response to determining that the plurality of credentials includes the relevant credential, the computing device displays an indication (e.g., credential suggestion 122) of the relevant credential. In some embodiments, the indication is selectable by the user to populate the authentication prompt with the relevant credential.

Exemplary Computer System

Figure 5:
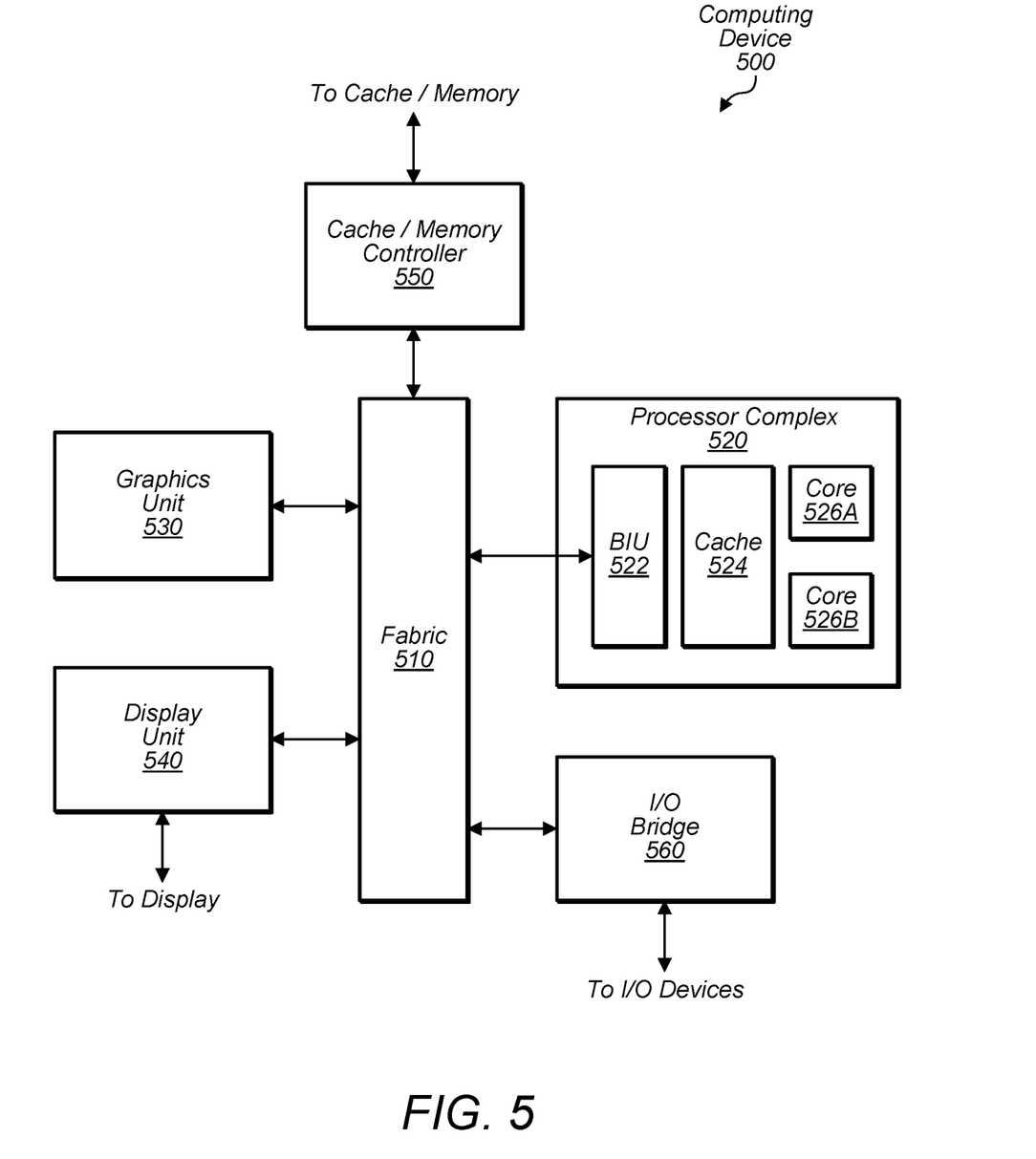
FIG. 5 is a block diagram illustrating one embodiment of an exemplary computer system.

Turning now to FIG. 5, a block diagram illustrating an exemplary embodiment of a computing device 500, which may implement functionality of device 10, is shown. Device 500 may correspond to any suitable computing device such as a server system, personal computer system, desktop computer, laptop or notebook computer, mainframe computer system, tablet computer, handheld computer, workstation, network computer, a mobile phone, music player, personal data assistant (PDA), wearable device, internet of things (IoT) device, etc. In the illustrated embodiment, device 500 includes fabric 510, processor complex 520, graphics unit 530, display unit 540, cache/memory controller 550, input/output (I/O) bridge 560. In some embodiments, elements of device 500 may be included within a system on a chip (SOC).

Fabric 510 may include various interconnects, buses, MUX's, controllers, etc., and may be configured to facilitate communication between various elements of device 500. In some embodiments, portions of fabric 510 may be configured to implement various different communication protocols. In other embodiments, fabric 510 may implement a single communication protocol and elements coupled to fabric 510 may convert from the single communication protocol to other communication protocols internally. As used herein, the term "coupled to" may indicate one or more connections between elements, and a coupling may include intervening elements. For example, in FIG. 5, graphics unit 530 may be described as "coupled to" a memory through fabric 510 and cache/memory controller 550. In contrast, in the illustrated embodiment of FIG. 5, graphics unit 530 is "directly coupled" to fabric 510 because there are no intervening elements.

In the illustrated embodiment, processor complex 520 includes bus interface unit (BIU) 522, cache 524, and cores 526A and 526B. In various embodiments, processor complex 520 may include various numbers of processors, processor cores and/or caches. For example, processor complex 520 may include 1, 2, or 4 processor cores, or any other suitable number. In one embodiment, cache 524 is a set associative L2 cache. In some embodiments, cores 526A and/or 526B may include internal instruction and/or data caches. In some embodiments, a coherency unit (not shown) in fabric 510, cache 524, or elsewhere in device 500 may be configured to maintain coherency between various caches of device 500. BIU 522 may be configured to manage communication between processor complex 520 and other elements of device 500. Processor cores such as cores 526 may be configured to execute instructions of a particular instruction set architecture (ISA), which may include operating system instructions (e.g., for OS 120) and user application instructions (e.g., for application 110). These instructions may be stored in computer readable medium such as a memory coupled to memory controller 550 discussed below.

Graphics unit 530 may include one or more processors and/or one or more graphics processing units (GPU's). Graphics unit 530 may receive graphics-oriented instructions, such as OPENGL®, Metal, or DIRECT3D® instructions, for example. Graphics unit 530 may execute specialized GPU instructions or perform other operations based on the received graphics-oriented instructions. Graphics unit 530 may generally be configured to process large blocks of data in parallel and may build images in a frame buffer for output to a display. Graphics unit 530 may include transform, lighting, triangle, and/or rendering engines in one or more graphics processing pipelines. Graphics unit 530 may output pixel information for display images.

Display unit 540 may be configured to read data from a frame buffer and provide a stream of pixel values for display. Display unit 540 may be configured as a display pipeline in some embodiments. Additionally, display unit 540 may be configured to blend multiple frames to produce an output frame. Further, display unit 540 may include one or more interfaces (e.g., MIPI® or embedded display port (eDP)) for coupling to a user display (e.g., a touchscreen or an external display).

Cache/memory controller 550 may be configured to manage transfer of data between fabric 510 and one or more caches and/or memories. For example, cache/memory controller 550 may be coupled to an L3 cache, which may in turn be coupled to a system memory. In other embodiments, cache/memory controller 550 may be directly coupled to a memory. In some embodiments, cache/memory controller 550 may include one or more internal caches. Memory coupled to controller 550 may be any type of volatile memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR4, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit in a chip-on-chip configuration, a package-on-package configuration, or a multi-chip module configuration.

Memory coupled to controller 550 may be any type of non-volatile memory such as NAND flash memory, NOR flash memory, nano RAM (NRAM), magneto-resistive RAM (MRAM), phase change RAM (PRAM), Racetrack memory, Memristor memory, etc. As noted above, this memory may store program instructions executable by processor complex 520 to cause device 500 to perform functionality described herein. In some embodiments, this memory corresponds to memory 102 discussed above.

I/O bridge 560 may include various elements configured to implement universal serial bus (USB) communications, security, audio, and/or low-power always-on functionality, for example. I/O bridge 560 may also include interfaces such as pulse-width modulation (PWM), general-purpose input/output (GPIO), serial peripheral interface (SPI), and/or inter-integrated circuit (I2C), for example. Various types of peripherals and devices may be coupled to device 500 via I/O bridge 560. For example, these devices may include various types of wireless communication (e.g., wifi, Bluetooth, cellular, global positioning system, etc.), additional storage (e.g., RAM storage, solid state storage, or disk storage), user interface devices (e.g., keyboard, microphones, speakers, etc.), etc.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims. Various embodiments described herein may gather and/or use data available from specific and legitimate sources to improve the delivery to users of invitational content or any other content that may be of interest to them. The present disclosure contemplates that, in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used to deliver targeted content that may be of greater interest to the user in accordance with their preferences. Accordingly, use of such personal information data enables users to have greater control of the delivered content. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely block the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure may broadly cover use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery services.

What is claimed is:

1. A non-transitory computer readable medium having program instructions stored therein that are executable by a computing device to cause the computing device to implement a credential manager that performs operations comprising:
   storing, in a protected manner, 1) a set of credentials for authenticating a user and 2) metadata about the set of credentials;
   providing, to a program, a separate copy of the metadata, wherein the metadata stored in the protected manner is not accessible to the program, and wherein the separate copy of the metadata is stored externally to the credential manager and is accessible to the program to determine whether the set of credentials includes a credential relevant to an authentication prompt;
   receiving, from the program, a request for the relevant credential;
   in response to the request, performing an authentication of the user; and
   based on the authentication, providing the requested credential to the program for supplying to the authentication prompt.

2. The computer readable medium of claim 1, wherein the operations comprise:
   receiving a request to store an additional credential for authenticating the user;
   storing the additional credential in an encrypted manner; and
   invoking an application programming interface (API) of the program to provide metadata about the additional credential.

3. The computer readable medium of claim 1, wherein the metadata includes usernames associated with the set of credentials.

4. The computer readable medium of claim 1, wherein the metadata includes a service identifier for the relevant credential, wherein the service identifier indicates a service associated with the relevant credential and is usable by the program to determine that the relevant credential is relevant to the authentication prompt.

5. The computer readable medium of claim 4, wherein the operations comprise:
   maintaining a ranking of credentials associated with the service, wherein the provided metadata includes information about the ranking usable by the program to select the relevant credential.

6. The computer readable medium of claim 1, wherein the operations include:
   storing the relevant credential in a database such that the relevant credential is retrievable from the database using a key, wherein the metadata includes the key associated with the relevant credential.

7. The computer readable medium of claim 1, wherein the operations comprise:
   receiving a request to update a particular credential of the set of stored credentials;
   in response to the request, updating the particular credential and metadata about the particular credential; and
   invoking an application programming interface (API) of the program to notify the program of the updating.

8. A computing device, comprising:
   a processor circuit; and
   a memory storing program instructions executable by the processor circuit to implement a credential manager that performs operations including:
      storing, in a protected manner, 1) a set of credentials for authenticating a user and 2) metadata about the set of credentials;
      providing, to a program, a separate copy of the metadata, wherein the metadata stored in the protected manner is not accessible to the program, and wherein the separate copy of the metadata is stored externally to the credential manager and is accessible to the program to determine whether the set of credentials includes a credential relevant to an authentication prompt;
      receiving, from the program, a request for the relevant credential;
      in response to the request, performing an authentication of the user; and
      based on the authentication, providing the requested credential to the program for supplying to the authentication prompt.

9. The computing device of claim 8, wherein the operations include:
   receiving a request to store an additional credential for authenticating the user;
   storing the additional credential in the protected manner; and
   invoking an application programming interface (API) of the program to provide metadata about the additional credential.

10. The computing device of claim 8, wherein the program is an operating system; and
   wherein the protected manner includes encryption.

11. The computing device of claim 8, wherein the operations include:
   identifying the relevant credential in the stored set of credentials based on a service identifier included in the request for the relevant credential.

12. The computing device of claim 8, wherein the relevant credential includes one-time password (OTP).

13. The computing device of claim 8, wherein the request for the relevant credential includes a key provided by the credential manager and usable to identify the relevant credential in a database maintained by the credential manager.

14. The computing device of claim 8, wherein the operations include:
   maintaining a ranking of credentials associated with a service; and wherein the providing of the relevant credential is based on the ranking of credentials.

15. A method, comprising:

storing, by a credential manager executing on a computing device, in a protected manner, 1) a set of credentials for authenticating a user and 2) metadata about the set of credentials;

providing, by the credential manager to a program, a separate copy of the metadata, wherein the metadata stored in the protected manner is not accessible to the program, and wherein the separate copy of the metadata is stored externally to the credential manager and is accessible to the program to determine whether the set of credentials includes a credential relevant to an authentication prompt;

receiving, by the credential manager from the program, a request for the relevant credential;

in response to the request, performing an authentication of the user; and based on the authentication, providing, by the credential manager, the requested credential to the program for supplying to the authentication prompt.

16. The method of claim 15, further comprising:

receiving, by the credential manager, a request to store an additional credential for authenticating the user;

storing, by the credential manager, the additional credential in an encrypted manner; and providing, by the credential manager, metadata about the additional credential to the program.

17. The method of claim 15, further comprising:

receiving, by the credential manager, a request to update a particular credential of the set of stored credentials;

in response to the request, updating, by the credential manager, the particular credential and metadata about the particular credential; and invoking, by the credential manager, an application programing interface (API) of the program to notify the program of the updating.

18. The method of claim 15, wherein the set of credentials is protected using one or more cryptographic keys derived based on authentication information provided by the user.

19. The method of claim 15, wherein the metadata includes service identifiers associated with the stored set of credentials and type information identifying types of the stored set of credentials.

20. The method of claim 15, wherein the program is an operating system; and wherein the credential manager is a third-party credential manager relative to the program.

* * * * *